US010782658B2

(12) United States Patent
Dittmann

(10) Patent No.: US 10,782,658 B2
(45) Date of Patent: *Sep. 22, 2020

(54) MOTION DETECTION DEVICE AND SYSTEM FOR MOTION CONTROLLED SWITCHING OF A PERIPHERAL DEVICE

(71) Applicant: International Business Machines Corporation, Armonk, NY (US)

(72) Inventor: Gero Dittmann, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,904

(22) Filed: Aug. 29, 2018

(65) Prior Publication Data

US 2019/0025780 A1 Jan. 24, 2019

Related U.S. Application Data

(63) Continuation of application No. 14/497,540, filed on Sep. 26, 2014, now Pat. No. 10,133,247.

(30) Foreign Application Priority Data

Dec. 18, 2013 (GB) .................................. 1322359.9

(51) Int. Cl.
*G05B 15/02* (2006.01)
*H05B 47/105* (2020.01)
(Continued)

(52) U.S. Cl.
CPC ........... *G05B 15/02* (2013.01); *H05B 47/105* (2020.01); *H05B 47/175* (2020.01); *Y02B 20/44* (2013.01)

(58) Field of Classification Search
CPC .......................... G05B 15/02; H05B 37/0227; H05B 37/0245; H05B 37/0281; Y02B 20/44; Y02B 20/48; F24F 11/30; F24F 2120/10
See application file for complete search history.

(56) References Cited

U.S. PATENT DOCUMENTS 5,386,210 A 1/1995 Lee
6,933,685 B2 8/2005 Gutta et al.
(Continued)

FOREIGN PATENT DOCUMENTS

CN 101375642 A 2/2009
CN 102024588 A 4/2011
(Continued)

OTHER PUBLICATIONS

List of IBM Patents or Patent Applications Treated As Related; Date Filed: Aug. 29, 2018; 2 pages.
(Continued)

Primary Examiner — Thomas C Lee
Assistant Examiner — Anzuman Sharmin
(74) Attorney, Agent, or Firm — Cantor Colburn LLP; Daniel Johnson

(57) ABSTRACT

A motion detection device for motion controlled switching of a peripheral device having a switching characteristic is suggested. The motion detection device comprises a motion detector for providing detection signals in response to detected motions and a memory for storing durations between the detection signals. The motion detection device further comprises a signal generator for outputting a switching signal to the peripheral device for switching the peripheral device from a first operation mode to a second operation mode for a activation period. A controller is further included for controlling the signal generator. Therein, the controller is configured to determine the activation period based on at (Continued)

least a selection of the durations between the detection signals stored in the memory and the switching characteristic of the peripheral device.

19 Claims, 5 Drawing Sheets

(51) Int. Cl.
*H05B 47/175* (2020.01)
*F24F 11/30* (2018.01)
*H05B 47/16* (2020.01)
*F24F 120/10* (2018.01)

(56) References Cited

U.S. PATENT DOCUMENTS

| | | | |
|---|---|---|---|
| 8,427,076 B2 | 4/2013 | Bourquin et al. | |
| 8,466,626 B2 | 6/2013 | Null et al. | |
| 9,189,751 B2 | 11/2015 | Matsuoka | |
| 2009/0121869 A1 | 5/2009 | Graichen | |
| 2010/0052925 A1* | 3/2010 | Hirabayashi | G05B 19/042 340/636.1 |
| 2010/0083017 A1* | 4/2010 | Fulkerson | G06F 1/3203 713/320 |
| 2010/0102760 A1 | 4/2010 | Reid et al. | |
| 2011/0144517 A1 | 6/2011 | Cervantes | |
| 2012/0143357 A1 | 6/2012 | Chemel et al. | |
| 2012/0153868 A1* | 6/2012 | Gu | H05B 37/0227 315/307 |
| 2012/0235579 A1 | 9/2012 | Chemel et al. | |
| 2012/0310376 A1 | 12/2012 | Krumm et al. | |
| 2013/0016009 A1 | 1/2013 | Godfrey et al. | |
| 2013/0069542 A1 | 3/2013 | Curasi et al. | |
| 2013/0103622 A1 | 4/2013 | Matsuoka et al. | |
| 2013/0173064 A1 | 7/2013 | Fadell et al. | |
| 2013/0221859 A1 | 8/2013 | Pavelchak | |
| 2013/0221860 A1 | 8/2013 | Mohan et al. | |
| 2015/0168932 A1 | 6/2015 | Dittmann | |

FOREIGN PATENT DOCUMENTS

| | | |
|---|---|---|
| JP | H0837091 A | 2/1996 |
| JP | 2002341051 A | 11/2002 |
| JP | 2010218845 A | 9/2010 |
| JP | 2013084386 A | 5/2013 |
| WO | 2011151754 A1 | 12/2011 |
| WO | 2013058968 A1 | 4/2013 |
| WO | 2013058969 A1 | 4/2013 |

OTHER PUBLICATIONS

Energy.Gov, [online]; [retrieved on Jul. 28, 2014]; retrieved from the Internet http://energy.gov/energysaver/articles/lighting-controls. Energy.Gov, "Lighting Controls," Department of Energy, Jul. 29, 2012, pp. 1-6.

* cited by examiner

MOTION DETECTION DEVICE AND SYSTEM FOR MOTION CONTROLLED SWITCHING OF A PERIPHERAL DEVICE

DOMESTIC AND FOREIGN PRIORITY

This application is a continuation of U.S. patent application U.S. Ser. No. 14/497,540 filed Sep. 26, 2014 which claims priority to Great Britain Patent Application No. 1322359.9, filed Dec. 18, 2013, and all the benefits accruing therefrom under 35 U.S.C. § 119, the contents of which in its entirety are herein incorporated by reference.

BACKGROUND

The invention relates to a motion detection device, a system comprising such a motion detection device, a method for operating a motion detection device and a computer program to execute such a method.

Motion detectors are used to control peripheral devices, e.g., lighting in public spaces such as hallways or restrooms. When the lighting is off and a motion is detected, such as the movement of a person, the lighting will be switched on and remain on for a fixed period of time, measured by a timer. Whenever the motion detector triggers the timer again, the timer is reset to its initial value and the light will remain on for at least another such timer interval. When the timer expires, the light is switched off again.

An optimal timer period, for which the light shall be switched on, therefore should be long enough to not switch off the light as long as people are still in the area, but short enough to switch off the device shortly after all people have left the area. To ensure that the device does not switch off, while a person is still in the area but is out of reach of the motion detector or is not moving, the device is kept on for a specified time after the motion detector receives the last trigger.

The optimal timer period to keep the light switched on, however, will vary with time, such as the time of day or the weekday, in particular when considering the energy used by warming up a lamp. In order to accommodate the setting for all cases such that the light is never switched off while a person is present, the time interval has to be set conservatively. That way, the light often is switched on for too long and thus power is wasted.

U.S. Pat. No. 5,386,210 A describes a method and an apparatus for detecting motion for use in an illumination control monitoring of a particular area. Therein, three sensors are provided to enhance the ability to detect a presence in the area and to return to a pre-triggering configuration and a deactivation of the light within a predetermined duration of absence of motion or sound.

U.S. Pat. No. 6,933,685 B2 describes a lighting controller processing at least one of audio and video information in order to activate or adjust a lighting device based on a number of predefined behavioral rules.

Document US 2013/0069542 A1 and US 2012/0310376 A1 are directed to the detection of behavior patterns of occupants.

Document US 2013/0173064 A1 describes a heating, cooling and air conditioning unit (HVAC), which is programmable by a user and which is designed to learn behavioral patterns of its users in order to control the HVAC by analyzing the users' inputs.

WO 2013/058968 A1 describes a thermostat having an occupancy sensor to detect physical presence of users within a responsive area of the occupancy sensor. A processing system of the thermostat may therein be configured to determine, whether sufficient conditions are met regarding an occupancy condition to enable an away-state feature of the thermostat.

WO 2013/058969 A1 describes a thermostat including a plurality of sensors, with at least one sensor configured to detect the presence of a user within proximity of the thermostat, in order to activate the interface.

Document US 2013/0103622 A1 is directed to intelligent controllers that monitor, learn, and modify one or more control schedules that specify a desired operational behavior of a device, machine, system, or organization controlled by the intelligent controller.

BRIEF SUMMARY OF THE INVENTION

In one embodiment, a motion detection device for motion controlled switching of a peripheral device having a switching characteristic includes a motion detector configured to provide detection signals in response to detected motions; a memory configured to store durations between the provided detection signals; a signal generator configured to output a switching signal to the peripheral device for switching the peripheral device from a first operation mode to a second operation mode for an activation period; and a controller configured to control the signal generator, wherein the controller is configured to determine the activation period based on at least a selection of the durations between the detection signals stored in the memory and the switching characteristic of the peripheral device.

In another embodiment, a system includes a peripheral device having a switching characteristic; and a motion detection device for motion controlled switching of the peripheral device, the motion detection device further comprising a motion detector configured to provide detection signals in response to detected motions, a memory configured to store durations between the provided detection signals, a signal generator configured to output a switching signal to the peripheral device for switching the peripheral device from a first operation mode to a second operation mode for an activation period, and a controller configured to control the signal generator, wherein the controller is configured to determine the activation period based on at least a selection of the durations between the detection signals stored in the memory and the switching characteristic of the peripheral device.

In still another embodiment, a method for motion controlled switching of a peripheral device having a switching characteristic includes receiving detection signals from a motion detector; storing durations of the detection signals in a memory; determining an activation period based on the durations of the detection signals stored in the memory and the switching characteristic of the peripheral device; and outputting a switching signal to the peripheral device for switching the peripheral device from a first operation mode to a second operation mode for the determined activation period.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
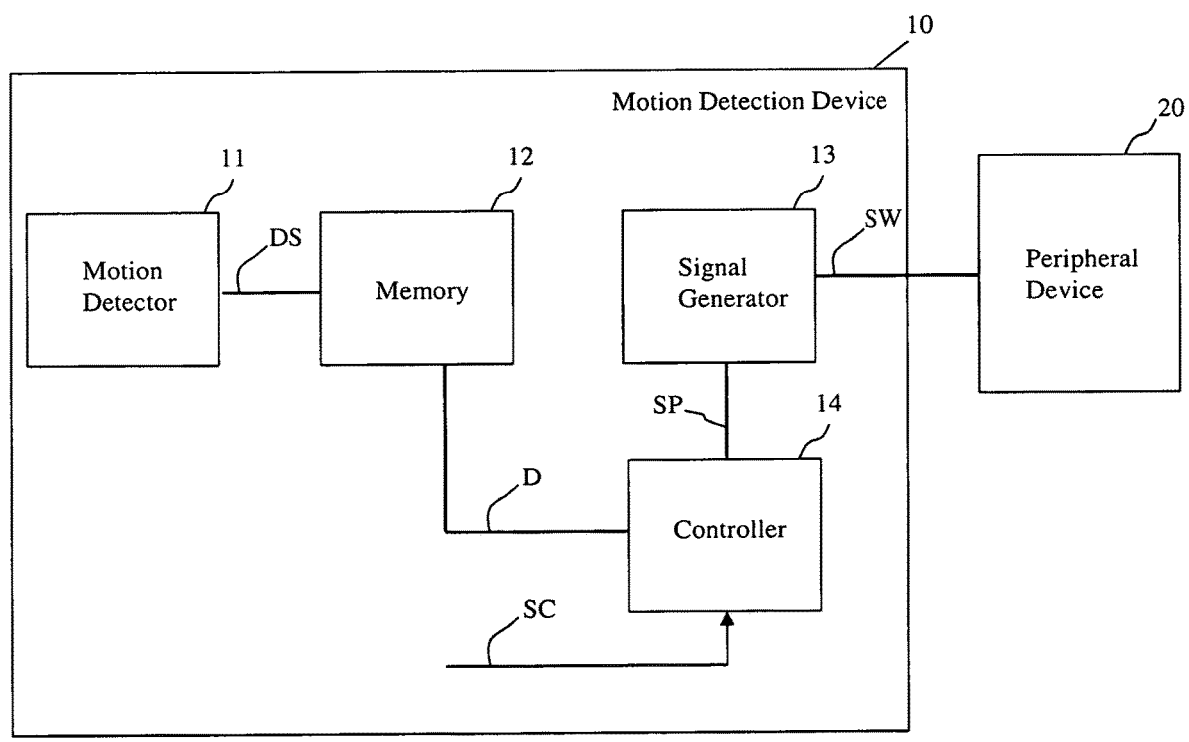
FIG. 1 shows a schematic block diagram of an embodiment of a motion detection device.

While the known prior art is configured to analyze and to adapt to the behavior of a specific user or a small group of users, one problem with the existing approaches is that the switching of light or other devices merely depends on behavioral patterns of users or on predetermined schedules. However, a problem persists that the switching of light or other devices may be uneconomical in view of specific characteristics of the device to be switched or of future behavior of the user.

For instance, when using fluorescent lamps as lighting source, switching on may consume significant warm-up energy every time the lamp is switched on. From an economical point of view, this energy should be amortized by long enough off periods. Further, a frequent switching of such lamps may negatively affect the lifespan of the lamp. Consequently, switching off the light shortly before it is needed again may be undesirable and should be avoided.

Disadvantageously, the known approaches do not provide a way to estimate, when a switching should be effected and when it should be omitted, in order to improve both the lifespan and the energy consumption of the device.

Accordingly, embodiments of the present invention provide an improved motion controlled switching of a peripheral device. According to a first aspect, a motion detection device for motion controlled switching of a peripheral device having a switching characteristic is suggested. The motion detection device comprises a motion detector for providing detection signals in response to detected motions and a memory for storing durations between the detection signals. The motion detection device further comprises a signal generator for outputting a switching signal to the peripheral device for switching the peripheral device from a first operation mode to a second operation mode for an activation period. In addition, the motion detection device comprises a controller for controlling the signal generator, wherein the controller is configured to determine the activation period based on at least a selection of the durations of the detection signals stored in the memory and the switching characteristic of the peripheral device.

Advantageously, the present motion detection device allows the determination of the activation period based on the durations between the detection signals stored in the memory. Therein, the activation period may be a timer period $t_P$ that determines how long the operation state is switched. That way, the motion detection device may adaptively learn whether an actual duration between two detection signals is long enough or too short to switch off. Storing the duration between two detection signals may also allow a determination when the duration between two detection signals was long and when it was short. As a further advantage, a selection of these durations may be considered, such that an adaptation for instance to the time of day, the weekday, special occasions such as holidays and similar may be considered.

In some implementations, the motion detection device may also comprise a unit to determine time or date-specific information and it may be configured to store this information along with the durations.

It may thus be possible to improve a switching rate of the peripheral device, e.g., to delay a switching-off of the peripheral device, when the duration between two detection signals was learned to be short, and to switch off the device, when it was learned that the duration between two detection signals is long. It may also allow a prediction whether or not the duration between two detection signals may, for future occurrences, also be long or short.

It is further advantageous that the switching characteristic of the peripheral device may be considered when determining the activation period. That way, an amortization time for amortizing the energy needed to switch on the device, may also be considered.

The amortization time, e.g., an off-time of the device to amortize the warm-up, may for instance be defined by the energy, required to start the device, e.g., a warm-up Energy $E_{warm-up}$, and the power $P_{warm}$ of the device, if it was running at ideal conditions for the time the warm-up takes. The amortization time then is $$t_{amoritze} = \frac{E_{warm-up}}{P_{warm}}.$$

According to some implementations, the motion detection device takes into account, whether or not the duration between two detection signals was learned to be equal or longer than the amortization time at a specific time, or not. According to some implementations, the motion detection device may also take into account, whether the duration between future occurrences of detection signals or the duration until the next detection signal from a present time is expected to be equal or longer than the amortization time, or not. For instance, data stored one day or one week in advance may be taken into account for the determination of the activation period at the present time. Of course, data stored at different times may also be used for the determination of the activation period. In particular, also data of several past occasions, during which data was stored may be considered, e.g., data stored at periodic intervals before the present time, like the same time of day one day and two days or more in advance, or one week and two weeks or more in advance. That way, statistical outliers of the occurrence of detection signals may be averaged out.

Advantageously, this allows adapting the activation period to a known and or an expected occurrence rate of detection signals. It may further allow adapting the activation period to the characteristic of the device, such as the amortization time. Thus, an energy-preserving way of switching the device with reduced wear of the device may be provided.

In an embodiment, the controller is configured to determine the activation period such that it is greater than or equal to a predetermined maximum time of inactivity of a person.

Advantageously, this allows keeping the peripheral device in a switched-on mode as long as a person is within the proximity of the detection field, even without triggering another detection signal. This may happen if the motion detector doesn't cover the entire area, or the person stops moving for some predetermined time, in particular the maximum time of inactivity.

In some implementations, the predetermined time may be a time a person occupies the specified area supplied by the peripheral device, e.g., by illumination of a hallway or a restroom. This time may also be stored in the memory of the motion detection device.

In some implementations, there may also be a plurality of predetermined maximum times of inactivity, for instance depending on a time of date, other sources of supply, such as natural light among others. For instance, it may be recognized that at specific times of the day, people crossing a detection area, which is to be illuminated, may move faster at some times, and slower at other times, or stop more often or more frequently. Further, a hallway might be illuminated by natural light and, during day light, there are only some passages of the hallway, which are to be supplied with light, while after sunset, an entire hallway is to be illuminated, effecting a likelihood and duration of inactivity.

The present invention thus may advantageously allow adapting the motion detection device to individual requirements of the location of use and also to varying conditions.

In a further embodiment, a timer for determining the durations between two subsequent detection signals is provided by the motion detector during a predetermined time period.

Advantageously, the motion detection device may thus determine and store the durations between subsequent detection signals within a time period, which is meaningful also for the present time. This time may in some implementations be, for instance, an hour. That way, the duration between two subsequent detection signals within one hour prior to the last detection signal may provide an indication as to the current occurrence rate of detection signals. Advantageously, the predetermined time period is relative to the last signal detection and thus is shifted in time. That way, always the predetermined time period prior to the last event will be considered for the determination of the activation period. As this occurrence rate of signal detection within such a time period will shift and thus vary, for instance between night time and day time or different times of day, the motion detection device may be controlled more in accordance with the actual circumstances. This can improve energy consumption and the life span of the peripheral device.

In some implementations, the predetermined time period may also be longer than an hour, for instance a couple of hours, a day, several days or more. It may, however, also be shorter, such as half an hour, or time periods on a minute scale. For setting the time period, also some switching characteristic of the device may be considered. It may, for instance, be advantageous to shorten the predetermined time period for measuring the duration between two subsequent detection signals, if the amortization time and/or the ramp-up time of the device is short, such as, for example, in the case of LED lights.

In case of a higher amortization time, such as for a fluorescent lamp and/or in case of a longer ramp-up time, such as of an HVAC system, a longer predetermined time period may be more advantageous. In general, it may be of advantage, to set the predetermined time interval on a time scale, which exceeds the time scale of amortization and/or of the maximum time of inactivity allowed.

In some implementations, the motion detection device may be configured to store at least those durations between two subsequent signal detections in the memory, which are measured by the timer in the predetermined time period. Further, the motion detection device may also be configured to delete or to overwrite data that was previously stored in the memory, with current data. That way, the memory size may be reduced and the power consumption of the motion detection device itself may be improved. In particular, a moving measurement period may be used in which each new measurement overwrites the oldest one, for example in a circular-buffer fashion.

In a further embodiment, the motion detection device may comprise a filter for filtering the durations determined by the timer such that only those determined durations are output that are longer than the predetermined maximum time of inactivity.

This may advantageously allow taking into account that due to frequent stopping of a person or an incomplete detection of the area with the motion detector, detection signals would be caused and counted as new triggers. By filtering out these detection signals, the activation period to switch the peripheral device from a first operation mode to a second operation mode will be started with respect to the first signal detection, e.g., when a person enters the detection field. Any detection signal received after this initial detection signal until the end of the maximum time of inactivity may be regarded as a permanent trigger. That way, the activation period may be determined such that the peripheral device may be switched off as shortly after a lapse of activity as possible if no further detection signals are received. It may then be safely concluded that the person has left the detection field.

In a further embodiment, the motion detection device may comprise a determiner for determining an occurrence for each of the determined durations between two subsequent detections signals output by the filter within the predetermined time period.

Advantageously, only those occurrences that are output by the filter shall be considered for the determination of the activation period, when the detector is not within the time of inactivity. Thus, the movements of people that for example may enter the detection field together will not be considered as individual occurrences. Also the stopping and continuing of movement by an individual person will not be counted. That way, the determination of the activation period may be enhanced.

In a further embodiment, the memory of the motion detection device may be configured to store, for each determined occurrence, a vector of occurrence and duration allocated to the occurrence. For example, the respective vector may include the counted number of occurrences for each measured duration.

This may allow consideration of more detailed information regarding the occurrence of detection signals, especially of the number of occurrences within a specific time interval. In particular, more detailed information may be stored in the memory for analysis of the occupation of the detection field. It may also allow to a user an easier way of evaluating and presenting an occupancy rate of the detection field.

In a further embodiment, the controller may be configured to determine the activation period based on the vectors stored in the memory and the switching characteristic of the peripheral device. That way, the determination of the activation period can be allowed to be in optimal accordance with the actual circumstances. A more sophisticated and more detailed switching scheme may thus be elaborated. Consequently, power consumption may be reduced and the switching characteristic of the device may be better taken into account.

In a further embodiment, the switching characteristic includes at least an amortizing time interval and a preferred operation mode allocated to the amortizing time interval, wherein the controller is configured to assess whether or not the peripheral device is to be switched to the preferred operation mode. Therein, the amortization time interval may be a time interval during which it is not useful to switch the peripheral device in order to save energy. Useful in this respect is to be understood such that a switching-off of the device may, on short term, save energy for not running the device. However, a detection signal shortly after switching off the device may require another switching-on, such that the energy consumed by switching the device on exceeds the energy it would have taken to leave it on in the first place.

Advantageously, the preferred operation mode of the peripheral device is an off-state of the peripheral device, such that no energy is consumed by the peripheral device. In some implementations, however, the preferred operation mode may also be a basic-supply mode, for instance in the case of air conditioning or air supply. It is also possible that the preferred operation mode is an on-mode.

In a further embodiment, the controller may be configured to determine a time interval having a probability of not receiving a further detection signal within the amortizing time interval from the motion detector equal to or greater than a probability threshold, e.g., 50%, and further configured to set the activation period to the determined time interval. This may yield the advantage that stochastically, when considering a longer time period, the number of cases in which the device is switched off for a time longer than the amortization time before the next detection signal is received is, in the case of a 50% probability, as big as the number of cases when this is not true. This means that there may be a net reduction of the energy consumption, even if in individual cases the device may be left in an undesirable operation mode longer than objectively necessary for the individual case.

In a further embodiment, the controller may be configured to set the switching time period to a calculated minimum time parameter $t_{pmin}$, wherein the controller is further configured to calculate the minimum time parameter $t_{pmin}$ by $$t_{pmin} = \min\left(t_P \;\middle|\; \sum_{t=t_P}^{t_P+t_{amortize}} occ(t) \leq \sum_{t=t_P+t_{amortize}}^{\infty} occ(t)\right).$$

wherein t designates time, $t_p$ designates the time parameter, $t_{amortize}$ designates the amortizing time interval, and occ designates the occurrences of duration t.

That way, a time parameter $t_{pmin}$ may be identified, having a probability, e.g., 50%, that the next detection signal, i.e., the next occurrence, is at least the amortizing time interval $t_{amortize}$ away. Setting this minimum time parameter $t_{pmin}$ as the activation period may thus allow reducing the energy consumption. Stochastically, it may be omitted in a majority of cases that the device is switched off to be switched back on within the amortization time.

In a further embodiment, the first operation mode may be an off-operation of the peripheral device, and the second operation mode may be an on-operation of the peripheral device. Advantageously, by providing only two operation modes, the controller may be configured in a less complex way. This may save costs.

In a further embodiment, the peripheral device may be an illumination device, in particular a fluorescent lamp, or an air conditioning device. In some implementations, the peripheral device may also be a common light bulb, or an LED or any other common illumination device. The peripheral device may also comprise other environmental control devices, for instance in order to supply fluids such as water or gases and so forth. The peripheral device may in some implementations also be a video system, which is activated to record or to play video activity.

It should be understood, that it is only one possible achievement of the present invention to improve energy consumption. However, implementations can be thought of, which may require that a device is running as long as possible, for instance in order to provide specific environmental condition, which may, for example, only be switched off or altered in case a person needs to access the environmentally controlled area. Thus, the operation modes "on" and "off" as indicated above are merely to be understood as examples of operation modes, without confining the invention to these specific implementations.

Moreover, the present motion detection device may be applicable to a switching of operation modes between a plurality of operation modes besides an on- and an off-mode. Thus, a step-wise or a continuous altering of the mode of the peripheral device may be executed based on the switching characteristic of the device in the same or similar matter, as well.

The memory may be any storing entity. Moreover, the filter may be any entity for filtering, the determiner may be any entity for determining, and the controller may be any entity for controlling.

The respective entity may be implemented in hardware and/or in software. If the entity is implemented in hardware, it may be embodied as a device, e.g., as a computer or as a processor or as a part of a system, e.g., a computer system. If the entity is implemented in software it may be embodied as a computer program product, as a function, as a routine, as a program code or as an executable object.

Any embodiment of the first aspect may be combined with any other embodiment of the first aspect to obtain yet another embodiment of the first aspect.

According to a second aspect of the invention, a system is suggested that comprises a peripheral device having a switching characteristic, and a motion detection device according to the first aspect for motion controlled switching of the peripheral device.

According to a third aspect, a method for motion controlled switching of a peripheral device having a switching characteristic is suggested. The method comprises receiving detection signals from a motion detector, and storing durations of the detection signals in a memory. In a further operation, a activation period is determined based on the durations of the detection signals stored in the memory and the switching characteristic of the peripheral device. In a further operation, a switching signal is outputted to the peripheral device for switching the peripheral device from a first operation mode to a second operation mode for the determined activation period.

According to a fourth aspect, a computer program is suggested. The computer program has a program code for executing the method for a motion controlled switching of a peripheral device according to the third aspect.

Exemplary embodiments of the present invention are now described with reference to the enclosed figures. Referring initially to FIG. 1, there is shown a schematic block diagram of an embodiment of a motion detection device 10. The motion detection device 10 comprises a motion detector 11, a memory 12, a signal generator 13, and a controller 14.

The motion detector 11 is configured to detect a motion within a detection field. The motion detector 11 therein may be one as it is readily known to the skilled person and will thus not be described in more detail regarding its generally known features.

When detecting a motion, the motion detector 11 transmits a detection signal DS. In the present embodiment, this detection signal DS is transmitted to the memory 12, where durations D between the detection signals DS are stored. The memory 12 then may provide the controller 14 with the durations D. These durations D in particular may also be durations D, which were stored in advance to the present time. For instance, these durations D may date back an hour, a week or longer. They may also be durations D of a specific desired time period or a time period which started in the past and reaches to the present.

The signal generator 13 is configured to transmit a switching signal SW to a peripheral device 20. In order to transmit the switching signal SW at an advantageous time, the controller 14 controls the signal generator 13. To this end, the controller 14 provides a activation period SP to the signal generator 13, which may only transmit a switching signal SW if an activation period SP determined by the controller has lapsed.

This activation period SP is determined in the controller 14 based on the input of the durations D and of a switching characteristic SC of the peripheral device 20.

The switching characteristic SC of the peripheral device 20 may comprise an amortization time, i.e., a time period of an off-mode of the peripheral device that, if the peripheral device was switched on, is equivalent to energy consumption when switching the device on. Further, the switching characteristic SC may include limitations regarding the frequency, with which the peripheral device may be switched, or others.

Figure 2:
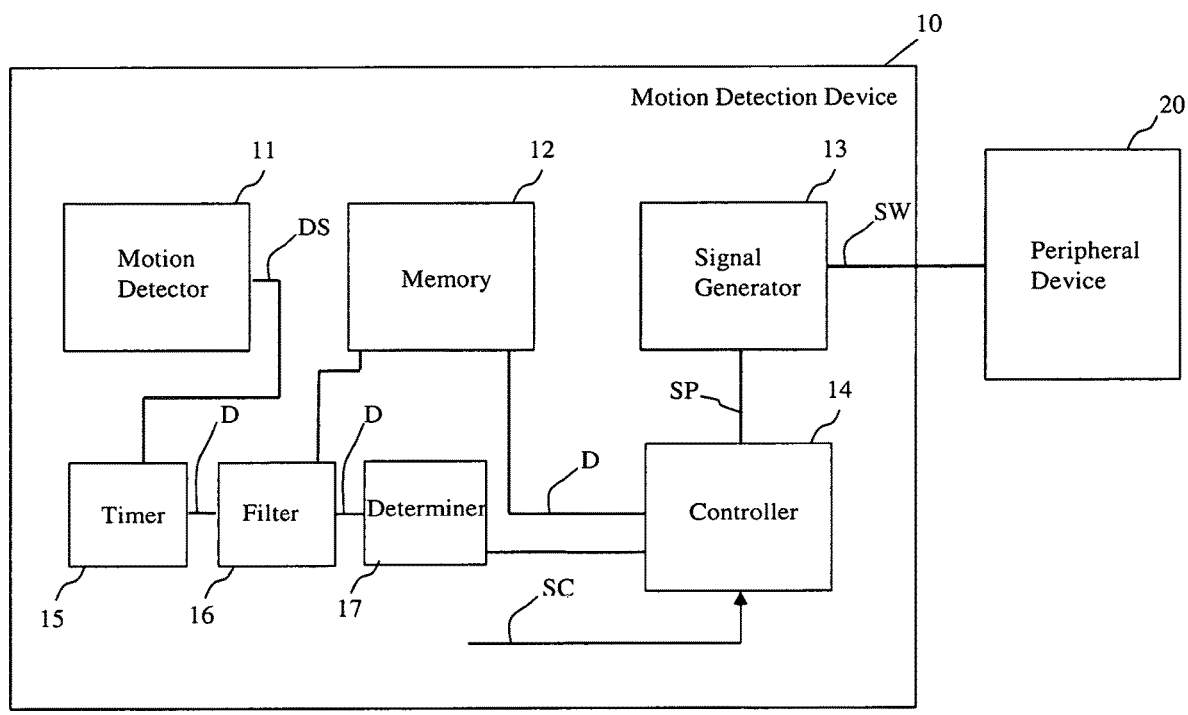
FIG. 2 shows a schematic block diagram of another embodiment of a motion detection device.

FIG. 2 shows a schematic block diagram according to an embodiment of the motion detection device 10. In order to avoid repetitions, functional units allocated with the same references as already described will not be described again.

In addition to the motion detection device 10 as described in the embodiment according to FIG. 1, in the embodiment according to FIG. 2 a timer 15 is provided, which determines the duration D between two subsequent detection signals DS. The timer 15 is configured to determine these durations D during a predetermined time period. This time period may be one hour or less. The time period however may also be longer than an hour, for instance 12 hours, 24 hours, a week, or any desired period.

Further, the embodiment according to FIG. 2 comprises a filter 16. The filter 16 may be configured such that only such durations D are output, which are longer than a predetermined maximum time of inactivity. This maximum time of inactivity may be preset by a user or may be assessed by data analysis of occupants' behavior within the detection field by the controller 14 itself (not shown). The filter 16 is configured to output the filtered durations D to the memory 12, which may store the durations D appropriately. Thus, contrary to the embodiment of FIG. 1, here the detection signals DS are not directly transmitted from the motion detector 11 to the memory 12.

In addition, in the embodiment according to FIG. 2, the filter 16 outputs the durations D to a determiner 17 connected to the filter 16. The determiner 17 may be configured to determine an occurrence for each of the determined durations D between two subsequent detection signals DS output by the filter 16 within the predetermined time period. That way, the determiner 17 may provide a count of occurrences during specific durations and provide a corresponding output to the controller 14. The controller 14 may then use the data to determine the activation period SP with greater detail.

It is to be understood that embodiments may exist, which comprise at least one of the timer 15, the filter 16 and/or the determiner 17, while at least one of the timer 15, the filter 16, and/or the determiner 17 is absent.

Figure 3:
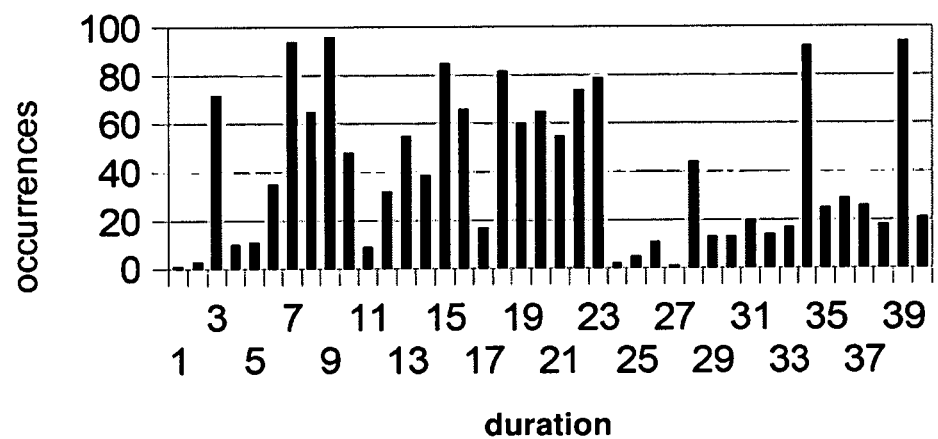
FIG. 3 shows a histogram illustrating a relation between duration between subsequent detection signals and an occurrence count of detection signals.

FIG. 3 shows a histogram which indicates on its X-axis the duration after a detection signal until a subsequent detection signal. On the Y-axis, the occurrences, i.e., the count of detection signals, within these intervals are indicated. The intervals may, for instance, be on the scale of seconds, of minutes or of hours, depending on the specific application of the motion detection device.

Figure 4:
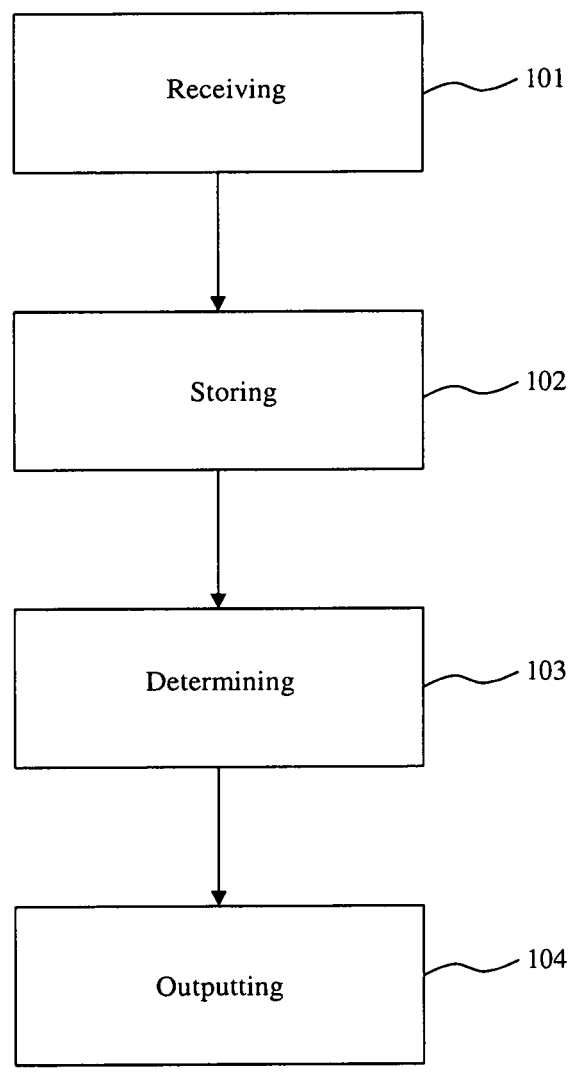
FIG. 4 shows an embodiment of a sequence of method operations for operating a motion detection device.

FIG. 4 shows an embodiment of a sequence of method operations for motion controlled switching of a peripheral device 20. In FIG. 4, an embodiment of a sequence of method operations for motion controlled switching of a peripheral device 20 by a motion detection device 10 is shown. The motion detection device 10 may be embodied as shown in FIG. 1. The motion detection device 10 includes a motion detector 11, a memory 12, a signal generator 13 and a controller 14. The method of FIG. 4 includes the following operations 101 to 104: In operation 101, a detection signal DS is received from the motion detector 11. In operation 102, durations D between detection signals DS are stored in the memory 12. In operation 103, an activation period SP is determined by the controller 14, based on the durations D of the detection signals DS stored in the memory 12 and on a switching characteristic SC of the peripheral device 20. In operation 104, a switching signal SW is output to the peripheral device 20 for switching the peripheral device 20 from a first operation mode to a second operation mode for the determined activation period SP.

Therein, the first and the second operation mode may be an on-mode and an off-mode, respectively. The operation modes, however, may also be two different levels of operation, excluding at least one of the on-mode and/or the off-mode of the peripheral device.

The activation period SP may for instance be determined by the following algorithm.

Therein, it is assumed that a list of histogram tuples<interval, occurrences>, H, in order of ascending intervals is given, as may be taken from FIG. 3. A time $t_P$ shall be returned by the algorithm as the activation period, i.e., the time until a switching signal SW is output to the peripheral device 20.

In the algorithm,

H indicates the entirety of the histogram tuples;

h, i indicate elements from H of specific intervals;

H.firstElement indicates the first element of all elements, i.e., the element representing the tuple with the shortest duration of detection signals and the corresponding count of occurrences;

tamortize indicates the amortization time of the device, which may be preset as a constant in the algorithm;

wastefulOccurrences indicates those occurrences of detection signals, which, if the device was switched off, would result in a wasteful, i.e., undesired switching of the device because an amortization time was not reached before receiving the next detection signal; these detection signals would thus suggest to keep the device switched on;

amortizedOccurrences, on the other hand, suggest to switch the device off, since they represent detection signals that were received after the amortization time had lapsed.

```
wastefulOccurrences = sum of h.occurrences of all h in H
with H.firstElement.interval ≤ h.interval < H.firstElement.interval +
tamortize
amortizedOccurrences = sum of h.occurrences of all h in H
with h.interval > H.firstElement.interval + tamortize
for each h in H after H.firstElement {
wastefulOccurrences = wastefulOccurrences -
h.previousElement.occurrences
shiftedOccurrences = sum of i.occurrences in H with
h.previousElement.interval + tamortize ≤ i.interval < h.interval +
tamortize
wastefulOccurrences = wastefulOccurrences + shiftedOccurrences
amortizedOccurrences = amortizedOccurrences - shiftedOccurrences
if amortizedOccurrences > wastefulOccurrences
return h.interval
}
return t_default
```

In case that the algorithm returns t_default, t_default may be set as the timer period $t_P$. The returned time t_default may be some value between H.lastElement.interval and infinity. It should be noted that the algorithm assumes that the subsequent measurement period of the motion detector will be similar to the one used for determining the timer period $t_P$.

Basically, the algorithm tries to find a suitable timer period by iteratively extending it, shifting occurrences from after the previous timer period to before the new one (shiftedOccurrences), until the goal is met that the count of occurrences suggesting a switch-off of the peripheral device is higher than the count of occurrences that would occur during the amortization time period.

A probability other than 50% can be targeted, e.g., by a factor f in the termination condition:

if amortizedOccurrences>wastefulOccurrences*f

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above method of FIG. 4 may be implemented in software, as an executable program, the latter executed by suitable digital processing devices. More generally, embodiments of the present invention can be implemented wherein general-purpose digital computers, such as personal computers, workstations, etc., are used.

Figure 5:
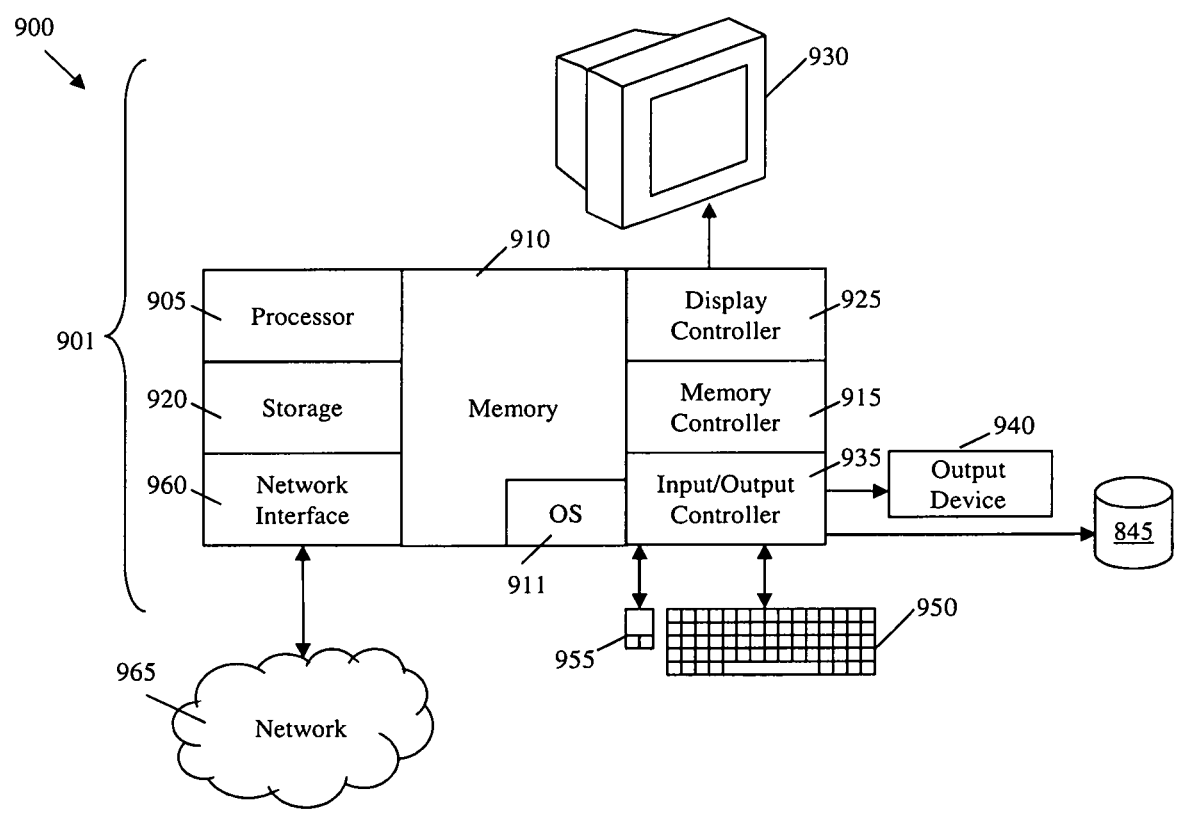
FIG. 5 shows a schematic block diagram of a computerized device designed for implementing embodiments of the present invention.

For instance, the system 900 depicted in FIG. 5 schematically represents a computerized unit 901, e.g., a general-purpose computer. In exemplary embodiments, in terms of hardware architecture, as shown in FIG. 5, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905.

The software in memory 910 may include one or more separate programs, each of which comprises an ordered listing of executable instructions for implementing logical functions. In the example of FIG. 5, the software in the memory 910 includes methods described herein in accordance with exemplary embodiments and a suitable operating system (OS) 911. The OS 911 essentially controls the execution of other computer programs, such as the method as described herein (e.g., FIG. 4), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax. etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 4) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGN LIST 10 motion detection device
11 motion detector
12 memory
13 signal generator
14 controller
15 timer
16 filter
17 determiner
20 peripheral device
101 method operation
102 method operation
103 method operation
104 method operation
D duration
DS detection signal
SC switching characteristic
SP activation period
SW switching signal

What is claimed is:

1. A motion detection device for motion controlled switching of a peripheral device having a switching characteristic, the motion detection device comprising:
a motion detector configured to provide detection signals in response to detected motions;
a memory configured to store durations between the provided detection signals;
a signal generator configured to output a switching signal to the peripheral device for switching the peripheral device from a first operation mode to a second operation mode for an activation period, wherein the switching characteristic includes at least an amortizing time interval and a preferred operation mode allocated to the amortizing time interval, wherein the controller is configured to assess whether or not the peripheral device is to be switched to the preferred operation mode; and
a controller configured to control the signal generator, wherein the controller is configured to determine the activation period based on at least: (a) a selection of the durations between the detection signals stored in the memory, (b) the switching characteristic of the peripheral device, and (c) a plurality of different predetermined maximum times of inactivity in a detection field of the motion detector wherein the controller is configured to set the activation period to a calculated minimum time parameter $t_{pmin}$;

$$t_{pmin} = \min\left(t_P \middle| \sum_{t=t_P}^{t_P+t_{amortize}} occ(t) \leq \sum_{t=t_P+t_{amortize}}^{\infty} occ(t)\right)$$

wherein t designates time, $t_p$ designates the time parameter, $t_{amortize}$ designates the amortizing time interval, and occ designates the occurrences of time t; and
wherein the memory is further configured to receive filtered durations from a filter for two subsequent detection signals, and to store for the two subsequent detection signals only the filtered durations.

2. The motion detection device of claim 1, wherein the controller is configured to determine the activation period such that it is greater than or equal to a first predetermined maximum time of inactivity of a person being in a detection field of the motion detector.

3. The motion detection device of claim 1, further comprising a timer configured to determine the durations between the two subsequent detection signals provided by the motion detector during a predetermined time period.

4. The motion detection device of claim 3, further comprising the filter, wherein the filter is configured to filter the determined durations determined by the timer such that only those determined durations are output that are longer than the first predetermined maximum time of inactivity.

5. The motion detection device of claim 4, further comprising a determiner configured to determine an occurrence for each of the determined durations between two subsequent detections signals output by the filter within the predetermined time period.

6. The motion detection device of claim 5, wherein the memory is configured to store, for each determined occurrence, a vector of occurrence and duration allocated to the occurrence.

7. The motion detection device of claim 6, wherein the controller is configured to determine the activation period based on the vectors stored in the memory and the switching characteristic of the peripheral device.

8. The motion detection device of claim 1, wherein the controller is configured to determine a time interval having a probability of not receiving a further detection signal within the amortizing time interval from the motion detector equal to or greater than a probability threshold, and further configured to set the activation period to the determined time interval.

9. The motion detection device of claim 1, wherein:
the first operation mode is an off-operation of the peripheral device; and
wherein the second operation mode is an on-operation of the peripheral device.

10. The motion detection device of claim 1, wherein the peripheral device is one of: an illumination device, or an air conditioning device.

11. A system, comprising:
a peripheral device having a switching characteristic; and
a motion detection device for motion controlled switching of the peripheral device, the motion detection device comprising:
a motion detector configured to provide detection signals in response to detected motions;
a memory configured to store durations between the provided detection signals;
a signal generator configured to output a switching signal to the peripheral device for switching the peripheral device from a first operation mode to a second operation mode for an activation period, wherein the switching characteristic includes at least an amortizing time interval and a preferred operation mode allocated to the amortizing time interval, wherein the controller is configured to assess whether or not the peripheral device is to be switched to the preferred operation mode; and
a controller configured to control the signal generator, wherein the controller is configured to determine the activation period based on at least: (a) a selection of the durations between the detection signals stored in the memory, (b) the switching characteristic of the peripheral device, and (c) a plurality of different predetermined maximum times of inactivity in a detection field of the motion detector wherein the controller is configured to set the activation period to a calculated minimum time parameter $t_{pmin}$;

$$t_{pmin} = \min\left(t_P \middle| \sum_{t=t_P}^{t_P+t_{amortize}} occ(t) \leq \sum_{t=t_P+t_{amortize}}^{\infty} occ(t)\right)$$

wherein t designates time, $t_p$ designates the time parameter, $t_{amortize}$ designates the amortizing time interval, and occ designates the occurrences of time t; and wherein the memory is further configured to receive filtered durations from a filter for two subsequent detection signals, and to store for the two subsequent detection signals only the filtered durations.

12. The system of claim 11, wherein the controller is configured to determine the activation period such that it is greater than or equal to a first predetermined maximum time of inactivity of a person being in a detection field of the motion detector.

13. The system of claim 11, further comprising a timer configured to determine the durations between the two subsequent detection signals provided by the motion detector during a predetermined time period.

14. The system of claim 13, further comprising the filter, wherein the filter is configured to filter the determined durations determined by the timer such that only those determined durations are output that are longer than the first predetermined maximum time of inactivity.

15. The system of claim 14, further comprising a determiner configured to determine an occurrence for each of the determined durations between two subsequent detections signals output by the filter within the predetermined time period.

16. The system of claim 15, wherein the memory is configured to store, for each determined occurrence, a vector of occurrence and duration allocated to the occurrence.

17. The system of claim 16, wherein the controller is configured to determine the activation period based on the vectors stored in the memory and the switching characteristic of the peripheral device.

18. A method for motion controlled switching of a peripheral device having a switching characteristic, the method comprising:
receiving detection signals from a motion detector;
storing durations of the detection signals in a memory, wherein the switching characteristic includes at least an amortizing time interval and a preferred operation mode allocated to the amortizing time interval;
determining that the peripheral device is to be switched to the preferred operation mode;
determining an activation period as a calculated minimum time parameter $t_{pmin}$;

$$t_{pmin} = \min\left(t_P \middle| \sum_{t=t_P}^{t_P+t_{amortize}} occ(t) \leq \sum_{t=t_P+t_{amortize}}^{\infty} occ(t)\right)$$

wherein t designates time, $t_p$ designates the time parameter, $t_{amortize}$ designates the amortizing time interval, and occ designates the occurrences of time t;
outputting a switching signal to the peripheral device for switching the peripheral device from a first operation mode to a second operation mode for the determined activation period;
overwriting the stored durations based on a movement measurement period; and
storing in the memory, for two subsequent detection signals, only filtered durations.

19. The method of claim 18, further comprising:
adjusting the activation period based on at least: (a) the durations of the detection signals stored in the memory, (b) the switching characteristic of the peripheral device, and (c) a plurality of different predetermined maximum times of inactivity in a detection field of the motion detector, wherein each of the predetermined maximum times of inactivity is associated with a different respective time of day.

* * * * *